United States Patent [19]

Drake et al.

[11] Patent Number: 4,789,425
[45] Date of Patent: Dec. 6, 1988

[54] THERMAL INK JET PRINTHEAD FABRICATING PROCESS

[75] Inventors: Donald J. Drake, Rochester; William G. Hawkins, Webster; Stephen F. Pond, Pittsford; Michael R. Campanelli, Webster; Pamela J. Hartman, Hilton; Raymond E. Bailey, Webster, all of N.Y.

[73] Assignee: Xerox Corporation, Stamford, Conn.

[21] Appl. No.: 82,417

[22] Filed: Aug. 6, 1987

[51] Int. Cl.$^4$ .................. B23P 15/00; G01D 15/16
[52] U.S. Cl. .................. 156/644; 29/611; 156/659.1; 156/662; 346/140 R
[58] Field of Search .................. 346/140, 1.1; 156/633, 156/644, 659.1, 661.1, 662; 29/611, 620, 592 R

[56] References Cited

U.S. PATENT DOCUMENTS

| | | | |
|---|---|---|---|
| 4,438,191 | 3/1984 | Cloutier et al. | 430/324 |
| 4,490,728 | 12/1984 | Vaught | 346/140 X |
| 4,502,060 | 2/1985 | Rankin et al. | 346/140 R |
| 4,568,953 | 2/1986 | Aoki et al. | 346/140 R |
| 4,587,534 | 5/1986 | Saito | 346/140 |
| 4,601,777 | 7/1986 | Hawkins et al. | 156/626 |
| 4,611,219 | 9/1986 | Sugitani | 346/140 |
| 4,675,693 | 6/1987 | Yano | 346/140 X |

FOREIGN PATENT DOCUMENTS 3402680 8/1984 Fed. Rep. of Germany .

Primary Examiner—Joseph W. Hartary
Attorney, Agent, or Firm—Robert A. Chittum

[57] ABSTRACT

A thermal ink jet printhead of the type which expels droplets on demand towards a recording medium from nozzles located above and generally parallel with the bubble generating heating elements contained therein is disclosed, together with fabrication processes therefor. The droplets are propelled along trajectories that are perpendicular to the heating element surfaces and from nozzles located in the printhead roof; such configuration is generally referred to as "roofshooter". Each printhead comprises a silicon heater plate and a fluid directing structural member. The heater plate has a linear array of heating elements associated addressing electrodes, and an elongated ink fill hole parallel with the heating element array. The structural member contains at least one recessed cavity, a plurality of nozzles, and a plurality of parallel walls within the recessed cavity which define individual ink channels for directing ink to the nozzles. The recessed cavity and fill hole are in communication with each other and form the ink reservoir within the printhead. The ink holding capacity of the fill hole is larger than that of the recessed cavity. The fill hole is precisely formed and positioned within the heater plate by anisotropic etching. The structural member may be fabricated either from two layers of photoresist, a two-stage flat nickel electroform, or a single photoresist layer and a single stage flat nickel electroform.

7 Claims, 11 Drawing Sheets

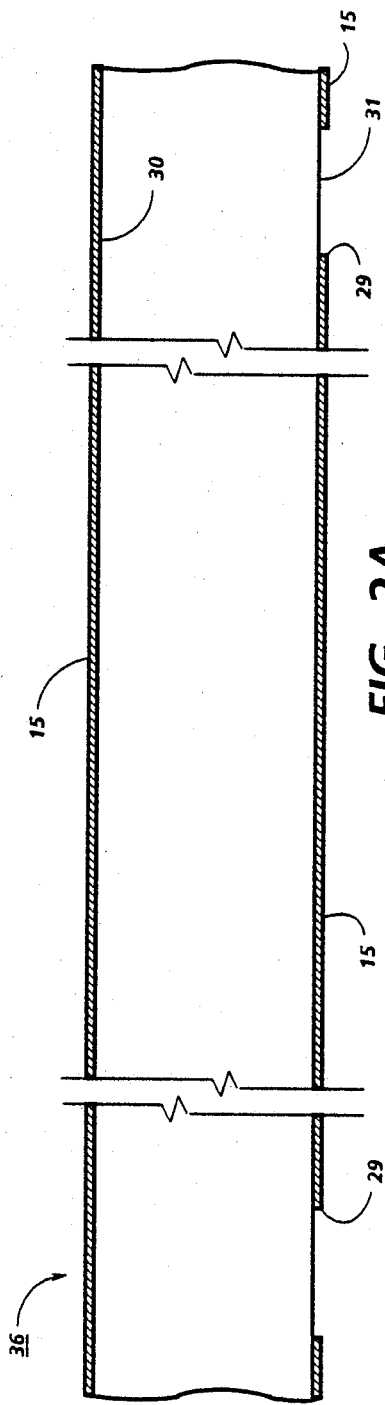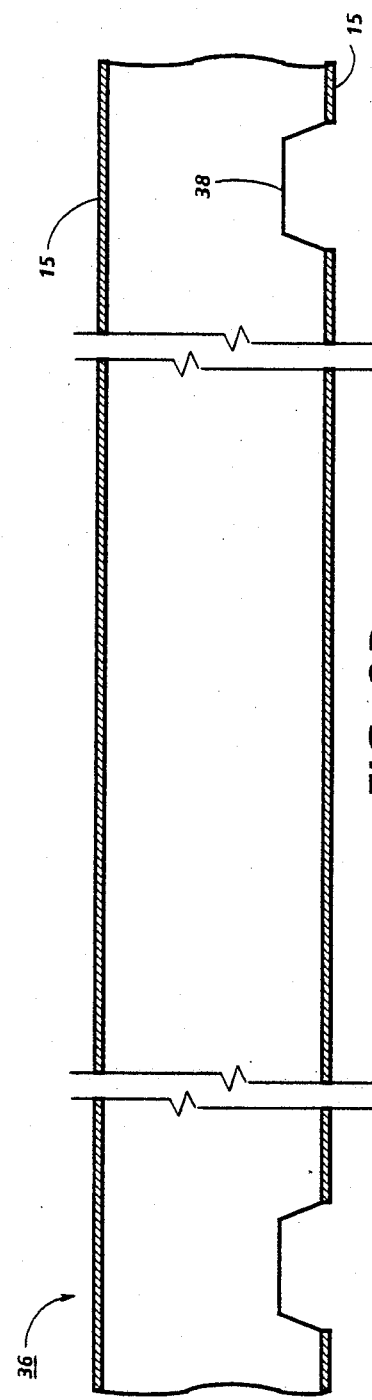

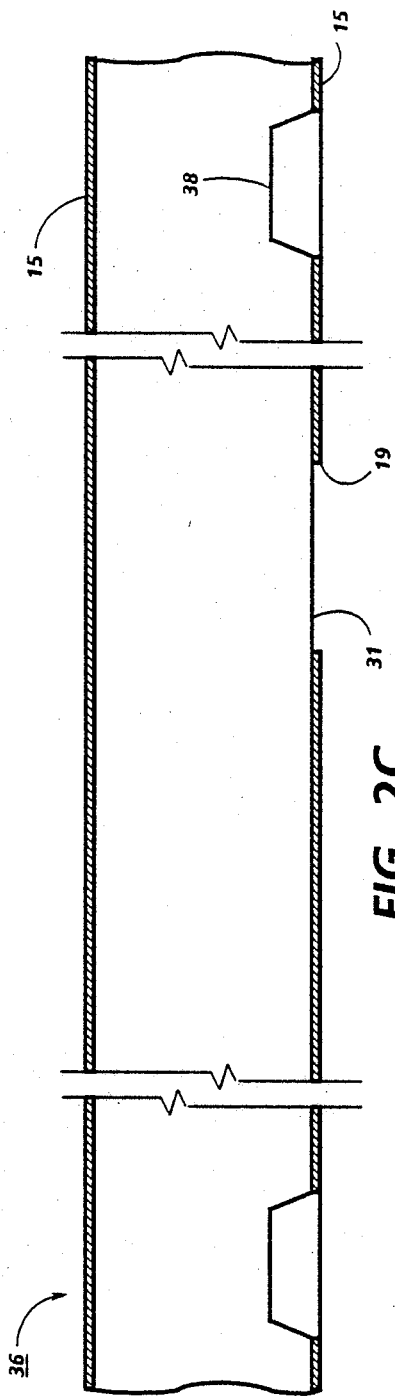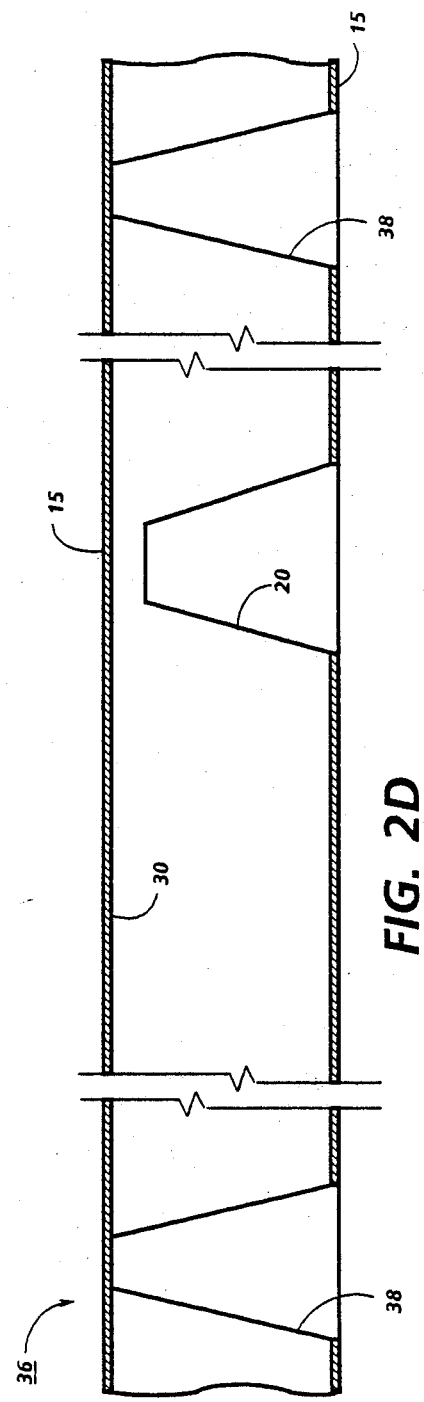

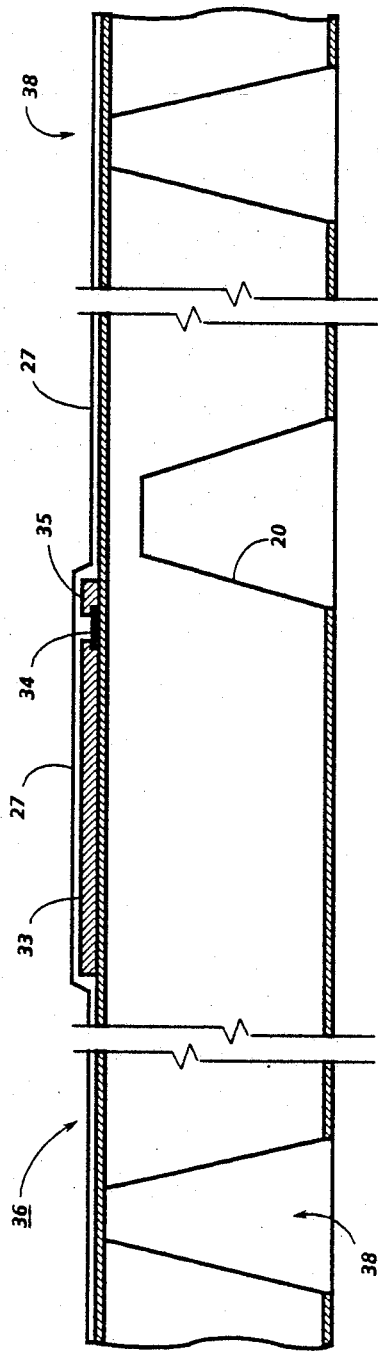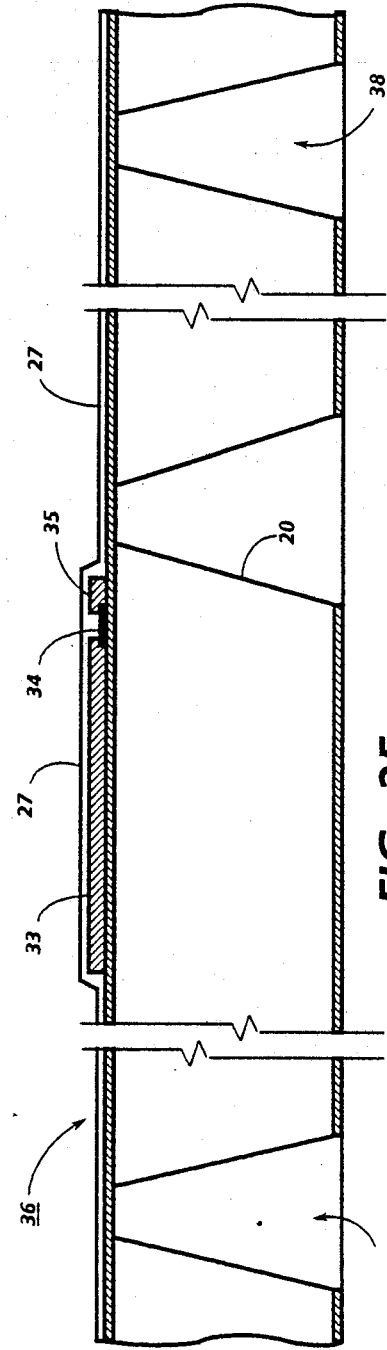
FIG. 2E
FIG. 2F

THERMAL INK JET PRINTHEAD FABRICATING PROCESS

BACKGROUND OF THE INVENTION

1. Field of the Invention

This invention relates to thermal ink jet printing on demand, and more particularly to thermal ink jet printhead configurations and processes for fabricating them.

2. Description of the Prior Art

There are two general configurations for thermal drop-on-demand ink jet printheads. In one configuration, droplets are propelled from nozzles in a direction parallel to the flow of ink in ink channels and parallel to the surface of the bubble generating heating elements of the printhead, such as, for example, the printhead configuration disclosed in U.S. Pat. No. 4,601,777 to Hawkins et al. This configuration is sometimes referred to as "edge or side shooters". The other thermal ink jet configuration propels droplets from nozzles in a direction normal to the surface of the bubble generating heating elements, such as, for example, the printhead disclosed in U.S. Pat. No. 4,568,953 to Aoki et al. This latter configuration is sometimes referred to as a "roofshooter".

In roofshooters, it is often desirable to supply ink to the nozzles via a passageway through the heater plates. This is the obvious choice because the proximity of the paper to the printhead makes any other design approach difficult. In a commerical drop-on-demand thermal ink jet printer sold by the Hewlett-Packard Company known as the Think Jet®, the printhead comprises a heater plate and a fluid distributor plate. The heater plate is a glass substrate having the heating elements and addressing electrodes formed thereon with a hole drilled or isotropically etched, so that the ink can be fed through the heater plate to a shallow reservoir in the fluid distributor plate which is made by electroforming a material such as nickel over a three-dimensional mandrel. The apertures or nozzles in the fluid distributor plate are provided by thick film resist spot patterns formed on the mandrel prior to initiation of the electroform process. When the heater plate and the fluid distributor plate are aligned and bonded together, the contour of the fluid distributor plate forms the shallow reservoir mentioned above and the ink channels to the apertures that serve as droplet emitting nozzles. The ink travels through the drilled or etched hole and across the plane of the heater plate, thus also across the addressing electrodes, to the nozzles. There are two major disadvantages of this configuration. One is that it exposes the electrodes to the ink whenever there are any pinholes in the passivation layer. Secondly, the ink reservoir is quite shallow because it must be formed by the electroform. The shallow reservoir tends to permit the ink to dry out in the nozzles, causing first drop problems.

U.S. Pat. No. 4,601,777 to Hawkins et al discloses a side shooter configuration for a thermal ink jet printhead and several fabricating processes therefor. Each printhead is composed of two parts aligned and bonded together. One part is a substantially flat substrate which contains on the surface thereof a linear array of heating elements and addressing electrodes, and the second part is a substrate having at least one recess anisotropically etched therein to serve as an ink supply manifold when the two parts are bonded together. A lineal array of parallel grooves also are formed in the second part, so that one end of the grooves communicate with the manifold recess and the other ends are open for use as ink droplet expelling nozzles. Many printheads can be made simultaneously by producing a plurality of sets of heating element arrays with their addressing electrodes on a silicon wafer and by placing alignment marks thereon at predetermined locations. A corresponding plurality of sets of channels and associated manifolds are produced in a second silicon wafer. In one embodiment, alignment openings are etched in the second silicon wafer at predetermined locations. The two wafers are aligned via the alignment openings and alignment marks, then bonded together and diced into many separate printheads.

U.S. Pat. No. 4,568,953 to Aoki et al, discloses a thermal ink jet printhead in which the ink droplets are ejected on demand through nozzles aligned above and parallel to the heating elements, so that the droplet trajectories are normal to the heating elements. Such configuration as indicated above is referred to as a roofshooter. In order to prevent nozzle clogging, the ink is circulated through the printhead in internal passageways having cross-sectional flow areas larger than that of the nozzles. This enables particulate matter larger than the nozzles to pass and be swept away by the circulating ink entering and leaving the printhead through inlet and outlet tubes.

German Patent Application OLS No. 3,402,680, filed Jan. 26, 1984, and published without examination on Aug. 2, 1984, discloses geometrical relationships of nozzle shapes, thicknesses and diameters, as well as nozzle placement relative to the heating elements, for a roofshooter configuration of a thermal ink jet printhead. Some fabrication details are given, including nozzle plates fabricated from stainless steel sheets with the nozzles being etched therein.

U.S. Pat. No. 4,438,191 to Cloutier et al discloses another method of making a roofshooter type thermal ink jet printhead which eliminates need for using an adhesive to construct multiple part assemblies.

U.S. Pat. No. 4,502,060 to Rankin et al, discloses a roofshooter type thermal ink jet printhead having two substantially L-shaped barriers located between an orifice plate and a heating element bearing substrate. The barriers are placed on opposite sides and partially surround the heating elements. The ink feed channels direct the ink to the space interior of the L-shaped barriers from opposite directions to impart an angular momentum to the ink relative to the heating elements during refill after droplet ejection and the bubble collapses.

The present roofshooter type thermal ink jet printheads require that the ink must lie over the passivated electrical leads to the heating elements. This provides a failure mode by shorting through any pinhole in the passivation coating. The ink is fed to the ink reservoir located over the electrical circuitry and heating elements, and this ink reservoir is quite shallow because it is formed by an electroforming process on a shaped mandrel. In addition to the tendency of the shallow reservoir to dry out causing first drop problems, such small capacity ink reservoirs, have high fluid inertia which causes problems in the resupplying of ink to the vicinity of the heating elements when multiple droplets are concurrently fired. These and other problems are solved by the following invention.

SUMMARY OF THE INVENTION

It is an object of the present invention to provide an improved, more cost effective thermal ink jet printhead having a roofshooter configuration by using a silicon substrate for the array of heating elements and addressing electrodes and combining therewith a reservoir/fill hole anisotropically etched therethrough. The reservoir/fill hole is not only dimensionally precise, but is precisely located relative to the heating elements.

It is another object of this invention to provide a roofshooter configured thermal ink jet printhead produced by the combination of etched silicon heating element substrate and double photosensitive layered structure containing the ink flow paths and droplet expelling nozzles to eliminate the alignment and bonding required when a separately fabricated channel plate is used.

It is still another object of this invention to provide a roofshooter configured thermal ink jet printhead produced by the combination of etched silicon heating elements substrate and a flat nozzle and ink channel electroform.

It is a further object of this invention to provide a roofshooter configured thermal ink jet printhead produced by the combination of etched silicon heating elements substrate, a photosensitive layer containing the ink flow paths, and flat nozzle containing electroform.

It is yet another object of this invention to provide a roofshooter configured thermal ink jet printhead produced by the combination of etched silicon heating element substrate having two arrays of heating elements, each array confronting adjacent opposite sides of an elongated reservoir/fill hole and staggered with respect to each other in order to double the printing resolution or the printing speed.

It is still a further object of this invention to provide a roofshooter configured color printing thermal ink jet printhead by grouping two or more monochrome printheads having etched silicon substrates and supplying each printhead with a separate colored ink.

In the present invention, a plurality of roofshooter type ink jet printheads are fabricated from a (100) silicon wafer. In one embodiment, a plurality of elongated ink reservoir/fill slots or holes and two or more alignment openings are anisotropically etched through one surface thereof in a two-step procedure. First, the alignment openings are etched for a short period of time so that only recesses are formed. Next, the ink fill slots are patterned and etched for a predetermined time period to prevent etching through the wafer, while enabling the alignment openings to etch completely through the wafer. Since the fill holes have not been etched through the wafer, the array of heating elements may be formed on the side of the wafer opposite to the one with the fill hole recesses, as taught in U.S. Pat. No. 4,601,777, linearly adjacent and parallel to the eventual location of the fill hole opening using the alignment holes as a means to align the pattern of heating element arrays in the precise location desired. Alternatively, the alignment holes may be completely etched through the wafer in one step, without the partial etch of the fill holes. This procedure, however, requires the use of a passivation layer for the subsequently formed circuitry which will protect the circuitry during an etch bath for etching the reservoir/fill holes. One such passivation layer is plasma enhanced CVD silicon nitride. Next, the heating elements and circuitry are fabricated, the arrays of heating elements being aligned so that when the fill holes are later etched through the wafer, each array of heating elements will be aligned adjacent one edge thereof. A passivation layer is deposited over the heating elements and circuitry which is capable of providing protection during anisotropic etching of the wafer for the reservoir/fill holes. The reservoir/fill holes are photolithographically patterned on the side of the wafer opposite the one with the heating elements and addressing circuitry. The reservoir/fill holes are anisotropically etched in the wafer, and finally the passivation layer removed to expose the electrical contact pads.

The side of the wafer having the heating element arrays and addressing electrodes is covered by a passivating insulating layer and then the wafer is returned to an anisotropic etchant for continued orientation dependent etching of fill hole recesses. When each fill hole recess opens against the electrode passivation layer on the opposite side of the wafer, it is removed from the etchant. The passivation layer is then patterned and etched or just stripped to expose the ends of the electrodes that are to serve subsequently as electrical contact pads, to open windows over the heating elements, and to produce an elongated opening through the substrate that will subsequently serve as the ink fill hole and partially as an ink reservoir.

A structural member having a plurality of recessed cavities, one for each fill hole in the silicon wafer is aligned and attached to the wafer substrate having the arrays of heating elements and electrodes so that the cavity is in communication with the fill hole. Each recessed cavity has a plurality of pairs of parallel walls therein and a nozzle for each pair of walls. When the structural member is aligned and attached to the wafer, the cavity and ink fill hole together form the ink reservoir and each pair of walls in each cavity define ink channels within the reservoir. Each pair of walls define an ink channel within the reservoir and has a respective nozzle and heating element. The nozzles are positioned above and equidistant from its associated heating elements and the channels provide ink replenishing flow paths from the reservoir to the heating elements and the nozzles thereabove. The fill hole portion of the reservoir is capable of containing a larger amount of ink than the cavity portion of the reservoir. The silicon wafer with the arrays of heating elements and the attached structural member are then diced into a plurality of individual printheads having the roofshooter configuration.

In the preferred embodiment, the structural member is formed by applying a first photoresist film in liquid form over the wafer surface and heating elements and addressing electrodes. This first photoresist film is photolithographically processed to form the plurality of cavities, each having a plurality of pairs of parallel walls. Next, a second dry photoresist film is deposited on the first film and the nozzles are photolithographically formed in the second film. In an alternate embodiment, the structural member is formed by laminating a first dry photoresist film over the wafer surface having the heating elements and circuitry. This first dry photoresist is photolithographically processed to form the ink flow cavities, followed by a second dry photoresist film deposited thereon which is processed as above to form the nozzles.

In another embodiment, the structural member is fabricated using a two-stage nickel electroform member produced from a flat mandrel. This member is fabricated by depositing a layer of photoresist on a flat mandrel and forming therefrom a pattern of posts which represent the nozzles. The first layer of nickel is deposited on the mandrel to a predetermined thickness, the thickness being larger than the height of the photoresist posts in order to permit inward radial growth of this first nickel layer to produce the nozzles having the desired internal diameter. A layer of negative photoresist is deposited over the first nickel layer and the exposed portions of the photoresist posts. This negative photoresist layer is patterned in alignment with the post pattern to form the cavity with the plurality of pairs of walls. A second layer of nickel is deposited over the negative photoresist recess pattern and exposed portion of the first nickel layer to form the two stage nickel structural member. The two-stage nickel structure is removed from the mandrel and the negative resist and the photoresist post pattern is etched therefrom to complete the process. In still another embodiment, the structural member is formed by applying a layer of photoresist material and photolithographically processing it to form the ink flow cavities. A single stage or flat nickel electroformed nozzle plate is aligned and bonded to the pattern photoresist material.

In yet another alternate embodiment, the printhead further comprises a second linear array of heating elements and addressing electrodes, each heating element array being on opposite sides of the elongated fill hole opening and being either offset from or aligned with one another. Each array of heating elements has its own separate recess cavity in communication with the elongated fill hole, thus the structural member has two separate recess cavities for each fill hole, and each recessed cavity has a plurality of pairs of walls. Each pair of walls form an ink replenishing channel having one nozzle spaced above a heating element, so that the lineal nozzle density of the printhead is doubled and consequently the printing resolution is doubled.

By grouping four separate printheads together having single or double arrays of heating elements, with each connected to a different colored ink supply, a full colored thermal ink jet printer can be provided.

The foregoing features and other objects will become apparent from a reading of the following specification in connection with the drawings, wherein like parts have the same index numerals.

BRIEF DESCRIPTION OF THE DRAWINGS

FIGS. 2A, 2B, 2C, 2D, 2E, 2F and 2G show a cross-sectional view of the silicon wafer and depict the process for producing the heating element substrate with its elongated ink filling slot.

FIG. 6C is also a cross-sectional view of the printhead as viewed along view line 6C—6C in FIG. 1.

While the present invention will be described hereinafter in connection with preferred embodiments thereof, it will be understood that it is not intended to limit the invention to those embodiments. On the contrary, it is intended to cover all alternatives, modifications, and equivalents as may be included in the spirit and scope of the invention as defined by the appended claims.

DESCRIPTION OF THE PREFERRED EMBODIMENT

Figure 1:
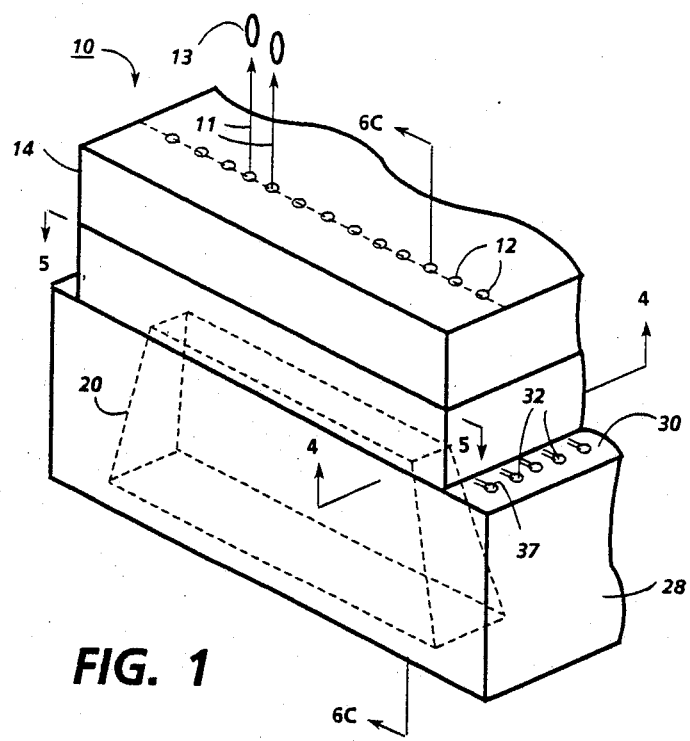
FIG. 1 is an enlarged, isometric view of a printhead having a roofshooter configuration and showing the ink droplet emitting nozzles with the elongated ink filling slot shown in dashed line.

In FIG. 1, a schematic representation of the printhead 10 of the present invention is partially shown in isometric view with arrows 11 depicting the trajectories of droplets 13 emitted from orifices or nozzles 12. The printhead comprises a structural member 14 permanently attached to heater plate or substrate 28. The material of the heater substrate is silicon because of the low cost bulk manufacturing capability for such plates as disclosed in U.S. Pat. No. 4,601,777 to Hawkins et al. Heater substrate 28 contains an etched opening 20, shown in dashed line, which when mated to the structural member 14, forms an ink reservoir or manifold as discussed more fully later. Electrode terminals 32 and common return terminals 37 extend beyond structural element 14 and lie at the edge of surface 30 of the heater substrate 28.

Figure 2G:
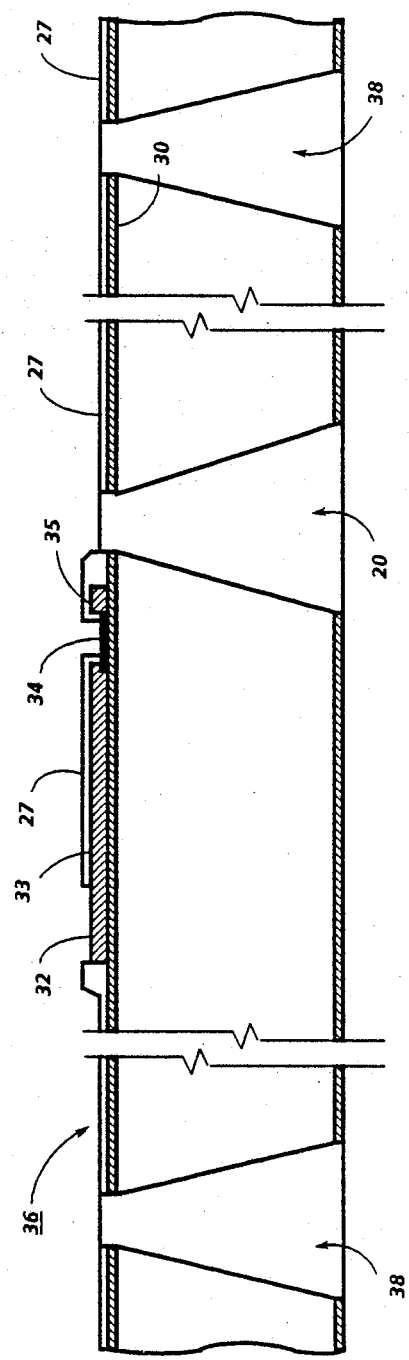

FIGS. 2A through 2G show the major steps in fabricating the heater plate including heating elements 34 and ink fill slot 20. These Figures show a cross-sectional view of the wafer 36 also shown in FIG. 3. The first process step shown in FIG. 2A, where masking film 15 of silicon nitride is deposited on both sides of a (100) silicon wafer 36 by low pressure chemical vapor deposition. In the preferred embodiment, alignment hole patterns are partially anisotropically etched through vias 29 into the wafer at two or three different locations and then the etching is terminated when the recesses reach about 2 mils or 50 μm deep. FIG. 2B depicts the alignment hole recesses 38. In the next step, a mask having the alignment marks and ink fill slot patterns is aligned and imaged on the wafer side 31, which contain the alignment hole recesses. FIG. 2C shows a cross sectional view of the via 19 for the elongated ink fill slot exposing the wafer surface 31. The wafer is again anisotropically etched until the alignment holes etch completely through the wafer, leaving only the substantially transparent masking film 15 covering them, and then the etching process is stopped leaving the elongated fill hole slots 20 approximately 2 mils or 50 μm short of etching completely through the wafer. FIG. 2D shows two alignment holes and the cross-sectional end view of the ink fill slot 20. Except for the two or three alignment holes (covered by the masking film), the entire wafer surface 30 is solid surface. Therefore, the heating elements and addressing electrodes and common return may be processed in a manner disclosed in U.S. Pat. No. 4,601,777.

Referring to FIG. 2E, a plurality of sets of bubble generating heating elements 34, their addressing electrodes 33, and common return 35 are patterned on the masking film on surface 30 of silicon wafer 36. One set of heating elements 34, with addressing electrodes 33 and common return 35, suitable for one ink jet printhead, is shown here and in the enlarged portion of FIG. 3. Prior to patterning the multiple sets of printhead electrodes 33, the resistive material that serves as the heating elements, and the common return 35, the silicon nitride layer may optionally be removed and replaced with an underglaze layer (not shown), such as silicon dioxide, having a thickness of between 5,000 Å and 1 micron. The resistive material 34 may be a doped polycrystalline silicon which may be deposited by chemical vapor deposition or any other well known resistive material such as zirconium boride. The common return and the addressing electrodes are aluminum leads deposited on the original silicon nitride layer or the underglaze layer and over the edges of the heating elements. The common return terminals 37 and addressing electrode terminals 32 are positioned at predetermined locations to allow clearance for wire bonding to a source of current pulses as disclosed in the above-mentioned U.S. Pat. No. 4,601,777, after the structural member 14 is attached to complete the printhead. The common return 35 and the addressing electrodes 33 are deposited to a thickness of 0.5 to 3.0 microns, with the preferred thickness being 1.5 microns. For electrode passivation, a 1 micron thick phosphorus doped chemical vapor deposition silicon dioxide film 27 is deposited over the entire plurality of sets of heating elements and addressing electrodes as shown in FIG. 2E. After the final CVD silicon dioxide passivation coat is deposited, the wafer is placed in an anisotropic etch having a slow silicon dioxide to silicon etch rate, for example, ethylene diamine pyrocatechol (EDP). This orientation dependent etching will complete the ODE etching of the elongated ink fill trough 20, so that the bottom of this etched trough is now covered only by the passivation layer 27 and masking film 15 (or substituted underglaze layer) as shown in FIG. 2F. In FIG. 2G, the passivation layer and masking film are etched off of the terminal ends of the common return and addressing electrodes, the heating elements 34, and the alignment holes 38 are elongated ink fill slots 20.

In another embodiment, the alignment holes 38 are completely etched through in one step, without the partial etch of the fill holes 20. Each array of heating elements and associated circuitry are fabricated in alignment with one edge of its subsequently provided fill hole 20 by using the alignment holes. When the circuitry is complete, a passivating layer 27, such as, for example, plasma enhanced chemical vapor deposited silicon nitride, is deposited on the circuit side of the wafer. The fill holes are photolithographically patterned on the other side of the wafer, and anisotropically etched in the wafer. The circuit passivating film 27 is removed, exposing the aluminum contact pads 32, 37 and heating elements 34. Also, the passivating film 27 and masking film 15 is removed from the fill holes 20 and alignment holes 38.

A tantalum (Ta) layer (not shown) may optionally be deposited to a thickness of about 1 micron on the heating elements for added protection thereof against cavitational forces generated by the collapsing ink vapor bubbles during the printhead operation.

Figure 3:
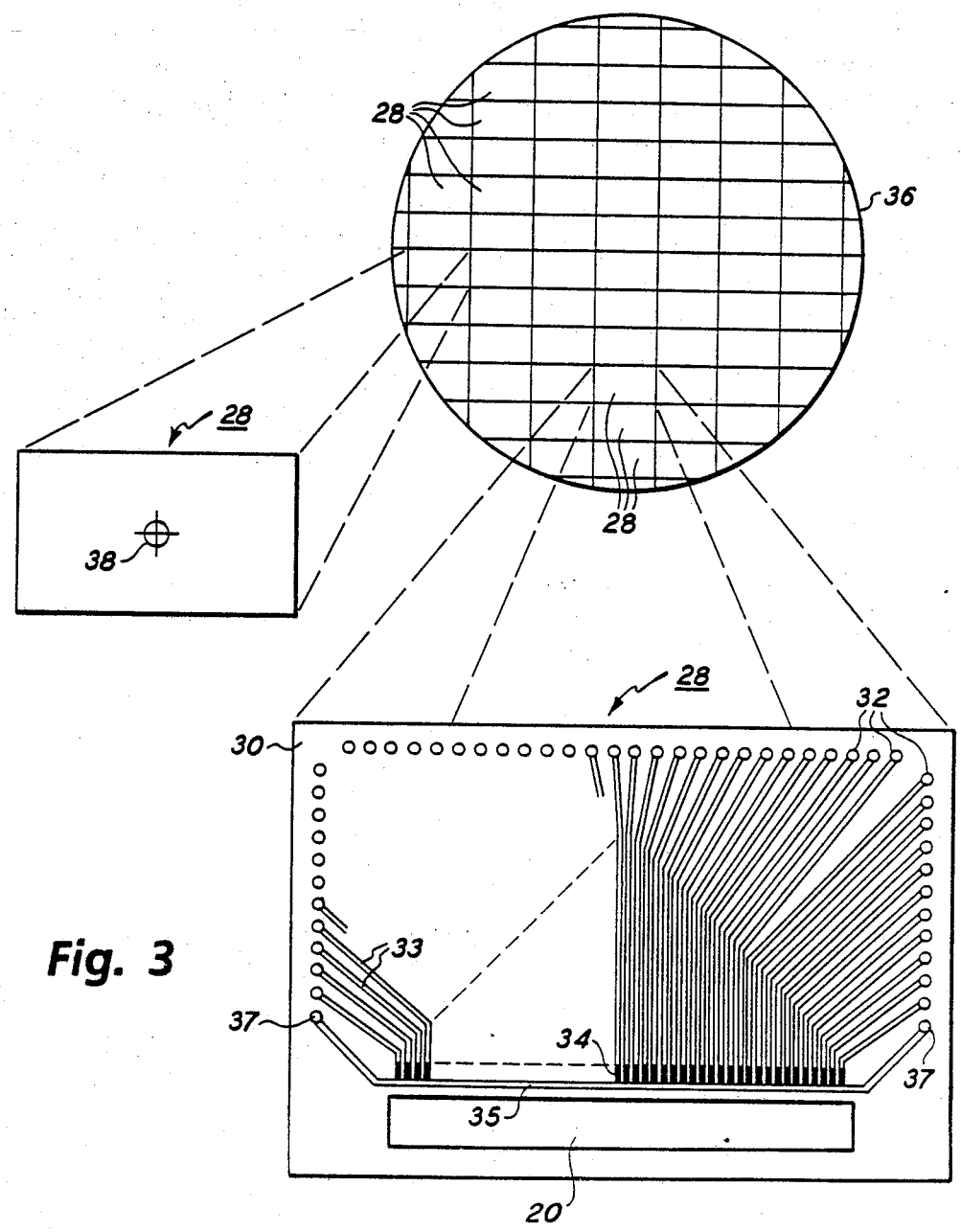
FIG. 3A is a schematic plan view of a wafer having both a plurality of heating element substrates, each having an array of heating elements with associated addressing electrodes, and a predetermined number of substrates with an alignment hole or mark.
FIG. 3B is an enlarged schematic plan view of one of the substrates from FIG. 3A having the alignment hole or mark.
FIG. 3C is an enlarged schematic plan view of one of the heating element substrates from FIG. 3A.

FIG. 3 shows the fully processed wafer 36 with a portion containing one of the two or three alignment holes 38 shown enlarged. Also, one portion 28 containing a one of the plurality of sets of heating elements and addressing electrodes together with its associated elongated ink fill slot 20 is shown enlarged.

Figure 4:
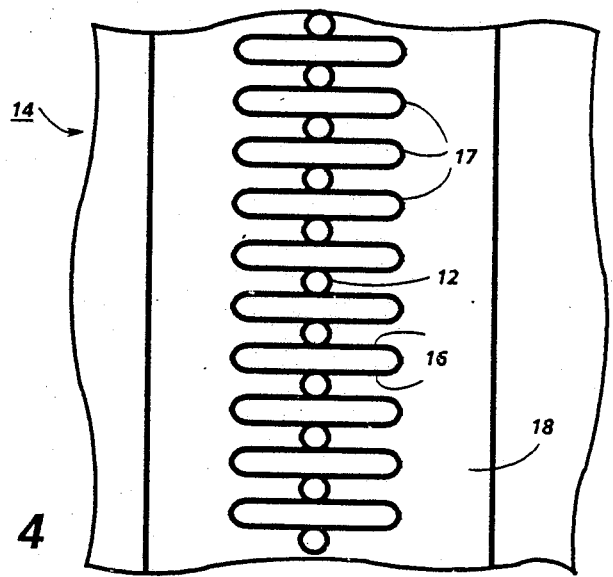
FIG. 4 is a partial view of the printhead as viewed along view line 4—4 of FIG. 1, showing the structural member from the bottom side to enable viewing of the recessed cavity and pairs of parallel walls therein.

In FIG. 4, a partial view of the structural member 14 is shown from the bottom as seen along view line 4—4 of FIG. 1, wherein the recessed cavity 18 is shown together with a plurality of parallel walls 17. Each wall 17 has substantially planar surface 16 on opposite sides thereof, so that pairs of confronting wall surfaces have located therebetween an associated nozzle 12 and heating element (not shown) below the nozzles. The fabricating process for this structural member is discussed later in connection with FIGS. 6A through 6C.

Figure 5:
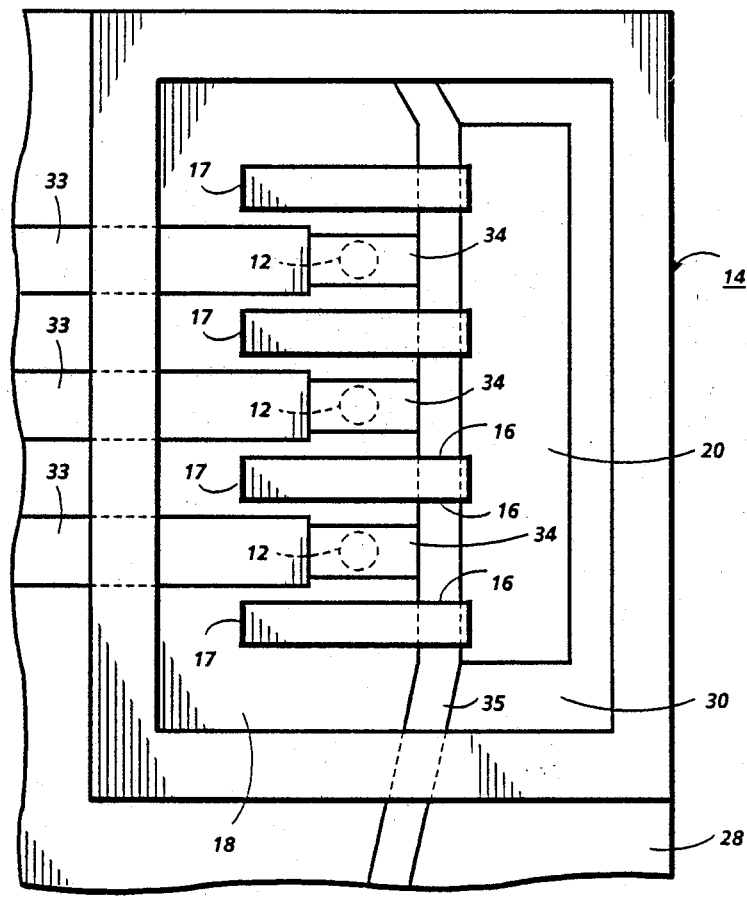
FIG. 5 is a schematic, simplified plan view of the printhead as viewed along view line 5—5 of FIG. 1, depicting the printhead as having only three ink channels for more clearly showing the relationship between the heating elements, nozzles, channel walls, and ink fill slots.

FIG. 5 shows an enlarged, simplified schematic plan view of the printhead as seen along view line 5—5, but showing only four walls 17 which produce three ink channels. The ink channels provide ink replenishing flow paths. This reduced number of ink channels and heating elements 34 therein is used for ease of depicting and explaining the invention. It being understood that a true view as seen along this view line would show a heating element and associated ink channel density of 300 per inch (25 mm) or more. The ink enters the elongated opening or slot 20 and fills the cavity 18 and ink channels defined by the wall surfaces 16 of walls 17. The nozzles 12 above the heating elements 34 are depicted in dashed line, since they cannot be seen in FIG. 5. The depth of the cavity 18 is between 1 to 2 mils (25 to 50 micrometers) so that the slot 20 holds 250 to 500 percent more ink. Also, only about 50 μm of length of each addressing electrode 33 is exposed to the ink in cavity 18, dramatically reducing the amount of passivated electrodes exposed to the ink and minimizing the likelihood of pinholes in that portion of passivation.

Figure 6A:
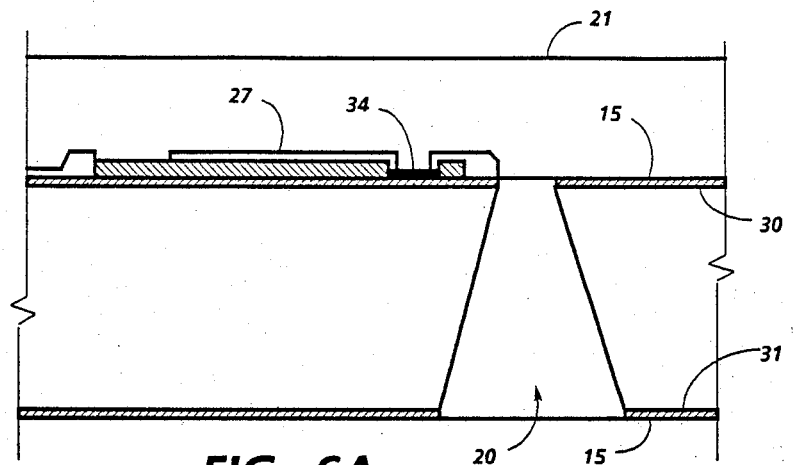
FIGS. 6A, 6B and 6C are enlarged, cross-sectional views of the fabrication steps for the ink handling structural member on the silicon wafer.
Figure 6B:
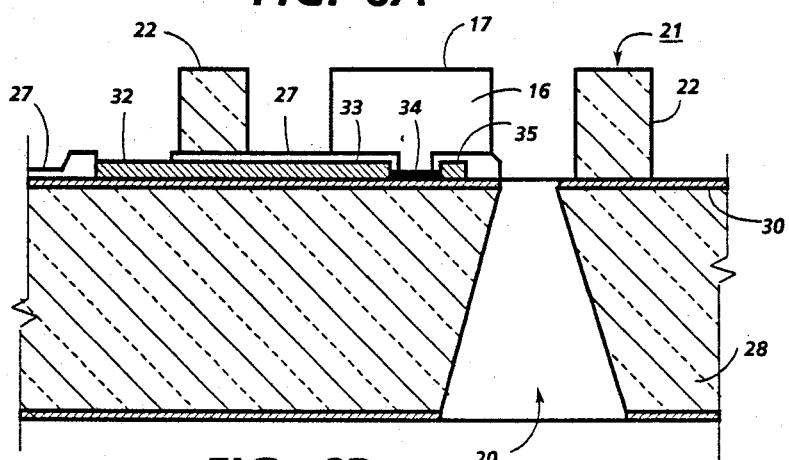
Figure 6C:
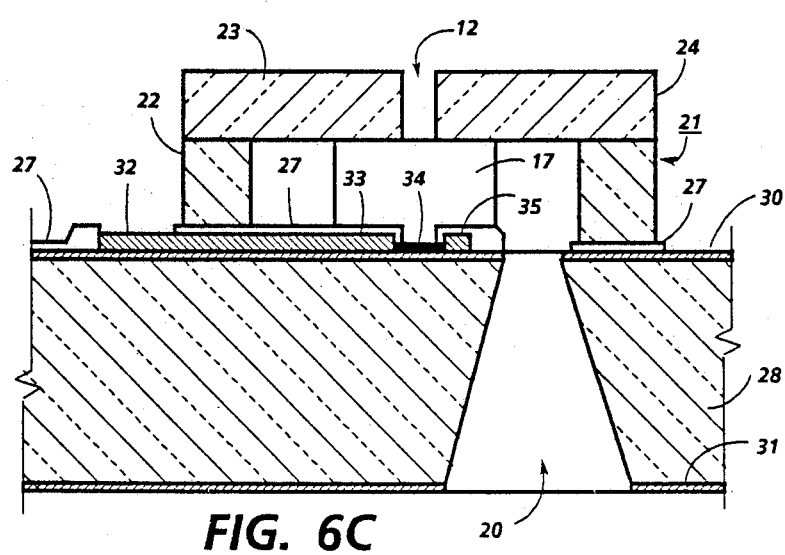

FIGS. 6A-6C show the major steps in fabrication the preferred fluid handling structural member 14. In FIG. 6A, a layer of patternable material 21 in liquid form is applied to the etched silicon heater plate 28 shown in FIGS. 2G and 3. Patternable materials are those which can be delineated by photosensitization, exposure, and development or by wet or dry etching through a pattern mask. For example, polyimide materials may be applied in liquid form as photosensitive layers using such products as Merck Selectilux HTR3-200, sold by EM Chemical, Co., followed by UV exposure, development and cure, or a non-photosensitive polyimide such as Pyralin ®, sold by the DuPont Corporation, may be applied in liquid form, cured and then patterned by use of a photo patterned mask layer and plasma etching in an oxygen plasma. In FIG. 6B, the cavity wall 22 and channel wall 17 patterns are aligned, imaged, and developed from patternable material layer 21. In FIG. 6C, a dry film photoresist 23 is placed on the patternable material layer 21 and aligned, imaged, and developed to form a roof 24, having the array of nozzles 12 therein. Alternatively, patternable material layer 21 could be a dry film photoresist that is laminated to the etched silicon heater plate 28 and, after photolithographically formeing the cavity wall 22 and channel walls 17, a second dry film photoresist 23 is placed on the first dry film 21. As in the above preferred embodiment, the roof 24 and array of nozzles 12 therein are formed.

Figure 7:
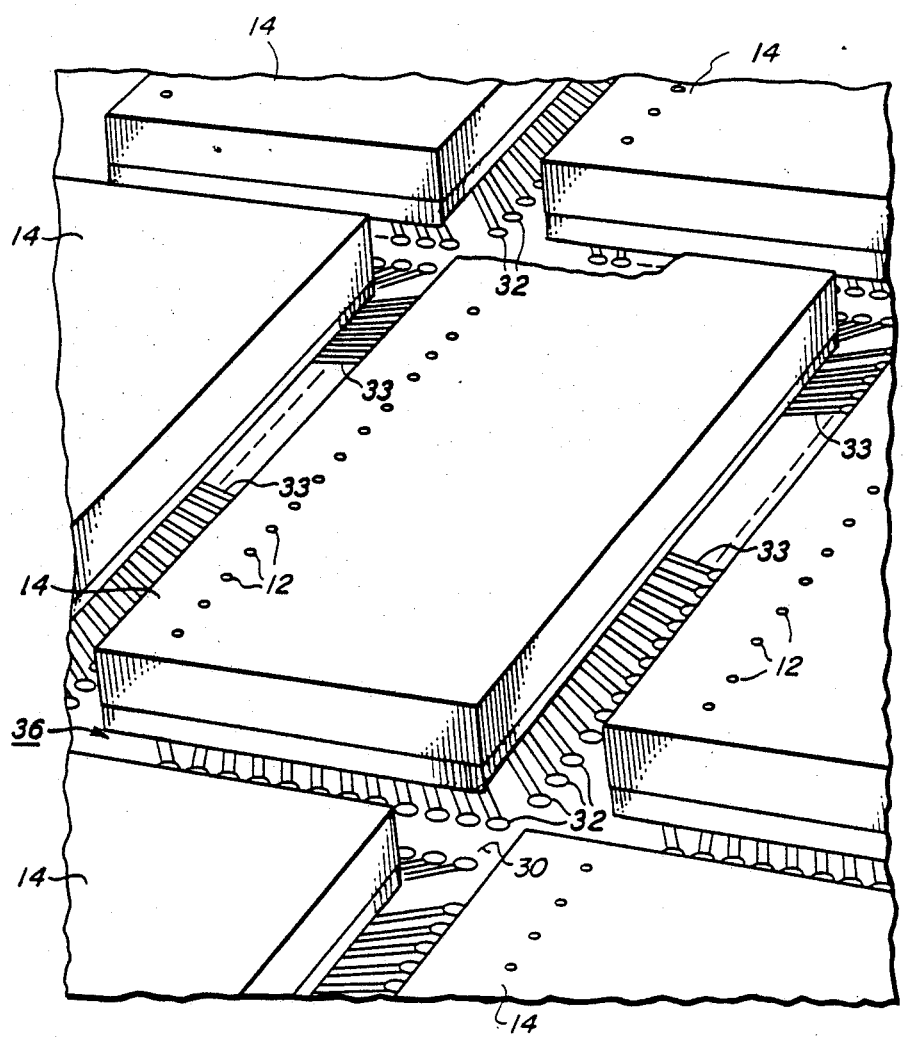
FIG. 7 shows an enlarged isometric view of the structural member bonded to the silicon wafer surface with the heating elements after the excess portion of the structural member has been removed exposing the addressing electrode terminals and prior to the final dicing step which produces the plurality of individual printheads.

FIG. 7 shows an enlarged, partially shown, isometric view of the completed wafer 36 after the processing step in FIG. 6C. The plurality of sets of heating elements and addressing electrodes, together with the structural member 14 applied thereto by the three step fabrication process of FIGS. 6A-6C are shown. The heating element wafer 36 is then diced to produce a plurality of individual printheads, one of which is shown in FIG. 1.

Figure 8:
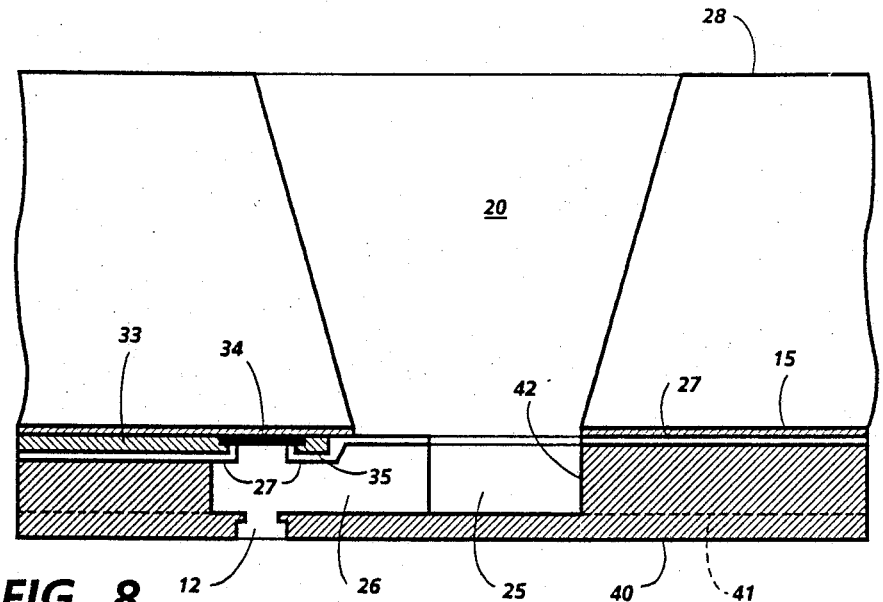
FIG. 8 is an enlarged cross-sectional view of a portion of the alternate embodiment of the printhead.

FIG. 8 shows a cross-sectional view of an alternate embodiment of the present invention. Instead of using a wet photoresist layer followed by a dry film photoresist layer or two dry film photoresist layers to fabricate the structural member 14, a two stage nickel electroform 40 is used instead. A linear array of posts (not shown) are formed on a flat mandrel (not shown) by photolithographic process well known in the art. A first layer of nickel 41 is electroplated on the mandrel to a thickness greater than the 0.5 μm height of the resist posts, so that radial inward growth of the electroplated nickel provides the desired internal nozzle diameters. Next, a thick of negative resist (not shown) is placed on the first nickel electroform and imaged ad developed using standard wafer processing equipment to provide a mask for the second stage of electroplating. A 2 mil or 50 μm thick second nickel layer 42 electroform is added to the first stage having the nozzles therein. The two stage nickel electroform 40 comprising layers 41 and 42 is then removed from the flat mandrel and the negative resist film patterned for the resist cavity 25, ink channels 26, and the photoresist posts are removed. The two stage nickel electroform is the structural member 14 of FIG. 1 and is aligned and bonded to the wafer 36, so that each cavity 25 is in communication with an elongated fill hole 20 and the associated ink channels 26 each contain one heating element 34 with nozzle 12 thereabove.

Figure 9:
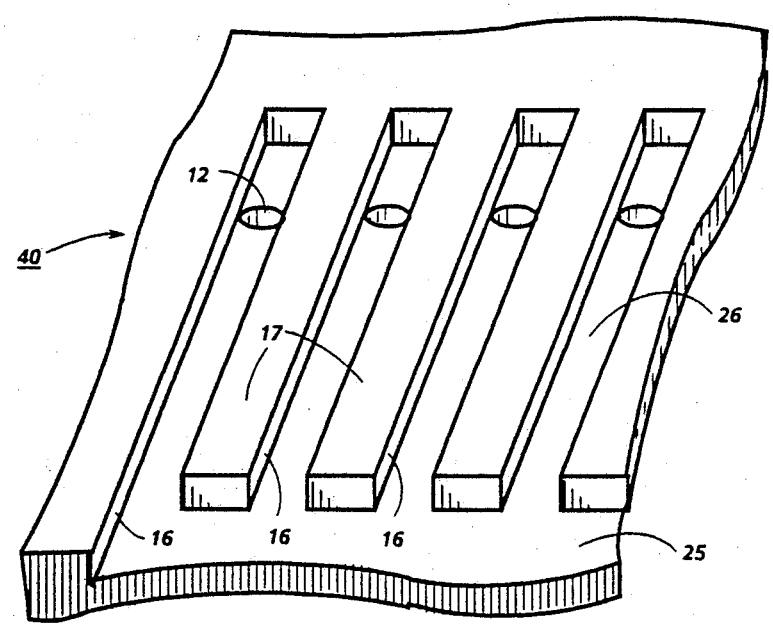
FIG. 9 is an enlarged isometric view of the alternate embodiment depicted in FIG. 8 which is analogous to the view of the embodiment shown in FIG. 4.

An enlarged isometric view is shown of a portion of the two stage nickel electroform 40 in FIG. 9, wherein walls 17 having parallel wall surfaces 16 form ink channels that contain a nozzle 12. The ink channels 26 are closed at one end near the nozzle and the other end opens into a common cavity 25. In FIG. 8 a large cross sectional view of the printhead comprising the silicon wafer 36 and arrays of heating elements and addressing electrodes are shown with the two stage nickel electroform bonded thereto with the electroform nozzles aligned directly over the heating elements.

The two stage electroform 40 could alternatively be replaced by a photoresist layer (not shown) similar to that shown in FIGS. 6A through 6C as layer 21 and covered by a single stage, flat electroformed nozzle plate (not shown) having an array of nozzles therein that is aligned and bonded thereto. In this alternative embodiment of the configuration depicted in FIGS. 8 and 9, the first stage layer 41 of the electroform 40 would be similar to the single stage nozzle plate (not shown) and the second stage 42 would be a separate photoresist layer, but having the same shape, that is produced by the process disclosed in conjunction with photoresist layer 21 in FIGS. 6A through 6C.

Figure 10:
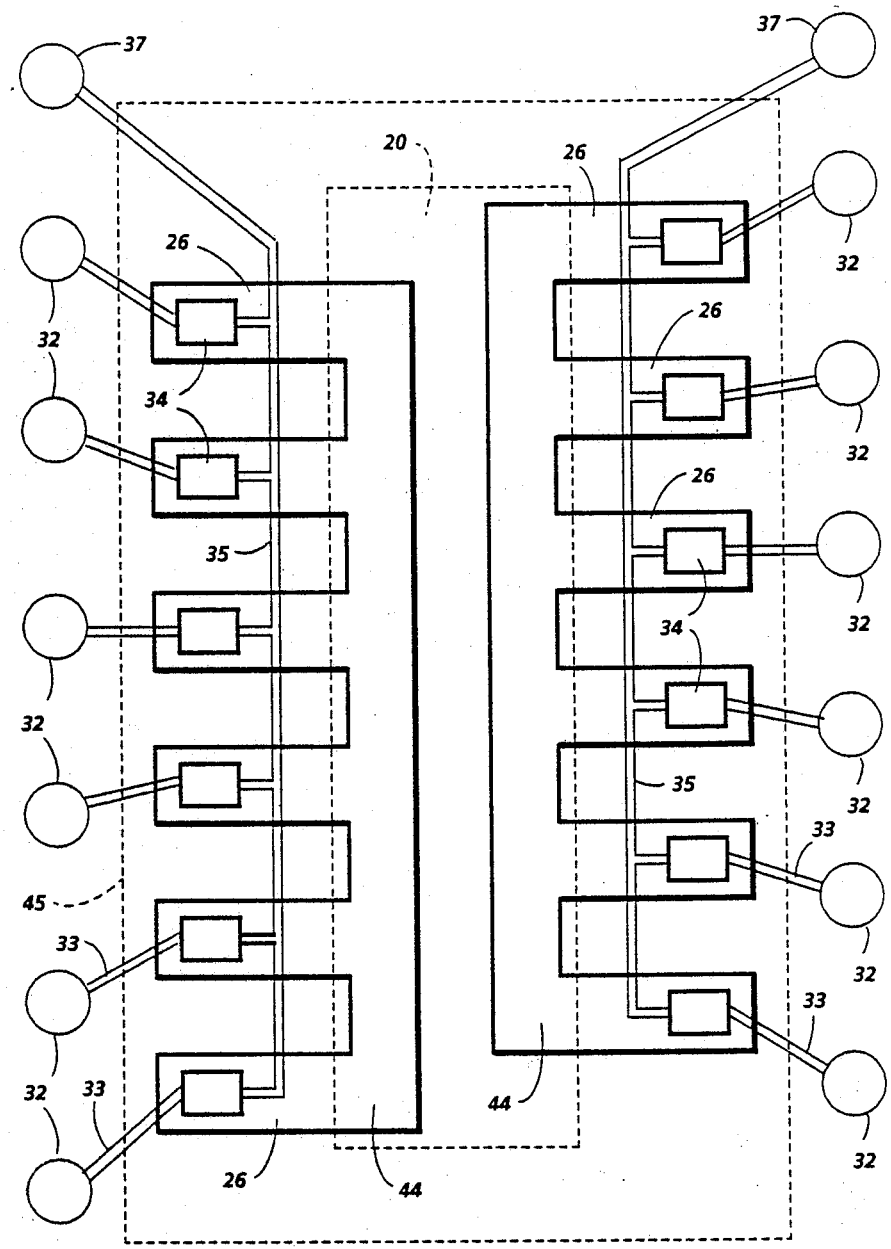
FIG. 10 is a schematic representation of a top view of an alternate embodiment of the present invention. This view is similar to the view shown in FIG. 5, but depicts two arrays of heating elements for each elongated fill hole, each heating element array being offset from each other and having its own separate ink cavity and ink channels.

Another alternative embodiment is shown in FIG. 10 where a partially sectioned plan view of a printhead is shown. The difference between this embodiment and all the other printheads is that each ink fill hole or slot 20 has an array of heating elements 34 and addressing electrodes 33 with common return 35 on each side thereof, aligned or slightly offset from each other. The aligned configuration is not shown. This two stage nickel electroform 45, shown in dashed lie, contains two separate cavities 44 each with ink channesl 26 positioned over the heating elements 34. At least a portion of the recessed cavities are in communication with the fill hole slot 20. In this manner, the lineal nozzle density of the other printhead is doubled and consequently either the printing resolution or the printing speed is doubled.

Many modifications and variations are apparent from the foregoing description of the invention and all such modifications and variations are intended to be within the scope of the present invention.

We claim:

1. A method for fabricating a roofshooter type thermal ink jet printhead for use in a drop-on-demand, ink jet printing device, comprising the steps of:
   (a) cleaning a silicon substrate having first and second parallel surfaces, the substrate surfaces being {100} planes;
   (b) depositing a layer of substantially transparent insulating material on the substrate surfaces;
   (c) patterning the insulative layer on one of the surfaces of the substrate to produce a predetermined number of alignment means thereon;
   (d) producing the predetermined number of alignment means on said one of the substrate surfaces;
   (e) forming a plurality of equally spaced, linear arrays or resistive material on the insulative layer of the first surface of the substrate for subsequent use as arrays of heating elements;
   (f) depositing a pattern of electrodes on the insulative layer of the substrate first surface to enable individual addressing of each heating element with electrical pulses;
   (g) applying a passivation layer over the insulative layer of the first surface of the substrate, including the electrode and the heating elements thereon;
   (h) patterning the insulative layer on the second surface of the substrate using the alignment means to produce a plurality of elongated vias therein;
   (i) placing the substrate in an anisotropic etchant for orientation dependent etching (ODE) thereof to produce elongated openings therethrough bounded by {111} planes which open against and are covered by the passivation layer and insulative layer on the substrate first surface, the elongated openings each being longitudinally aligned adjacent a respective one of the arrays of heating elements in a precise predetermined location;

(j) patterning and etching the passivation layer to expose ends of the electrodes that are to serve subsequently as electrical contact pads, to open windows over the heating elements, and to produce an elongated openings through the substrate by removing the insulative material and passivation layer over the etched elongated openings, so that the elongated openings may serve subsequently as both ink fill inlets and as ink reservoirs;

(k) aligning and attaching a structural member to the first surface of the substrate, the structural member containing a plurality of recessed cavities, each having a plurality of parallel walls therein and each having a plurality of nozzles communicating with a respective cavity, the nozzles being located such that one nozzle is located between each pair of walls and above a respective heating element, each cavity being in communication with a respective elongated opening in the substrate, so that each combination of cavity and elongated opening form a complete ink reservoir, with the elongated opening portion of the reservoir capable of containing more ink than the the cavity portion of the reservoir; and (l) dicing the substrate and attached structural member into a plurality of individual printheads.

2. The method of claim 1, wherein the structural member comprises first and second patternable layers and the step of aligning and attaching is concurrently provided during fabrication thereof.

3. The method of claim 2, wherein the method for fabricating the structural member comprises the steps of:

(a) applying a first layer of patternable material over the first surface of the substrate, including the heating elements and addressing electrodes;

(b) forming the cavities and plurality of pairs of parallel walls in each cavity in the first layer of patternable material;

(c) placing a second layer of patternable material on the first layer of patternable material; and (d) forming the nozzles in the second layer.

4. The method of claim 1, wherein the second layer of patternable material is a dry photoresist film.

5. The method of claim 1, wherein the structural member is a two stage metal electroform.

6. The method of claim 5, wherein the method for fabricating the two stage metal electroform comprises the steps of:

(a) depositing a layer of photoresist on a flat mandrel;

(b) forming a pattern of posts from the photoresist layer, said posts representing the nozzles;

(c) electroforming a first layer of nickel on the mandrel to a predetermined thickness, said layer thickness being larger than the height of the photoresist posts in order to permit inward radial growth of the first nickel layer to produce nozzles having the desired internal diameter;

(d) depositing a layer of negative photoresist over the first nickel layer and photoresist posts;

(e) forming a recess pattern in the negative photoresist layer in alignment with the post pattern;

(f) electroforming a second layer of nickel over the negative photoresist recess pattern and the exposed portion of first nickel layer to form a two-stage nickel structural member;

(g) removing the two-stage nickel structural member from the mandrel; and (h) dissolving the negative photoresist recess pattern and the photoresist post pattern from the two stage nickel structural member.

7. The method of claim 1, wherein the insulative layer patterned in step (c) is patterned on the second substrate surface and the alignment means are vias in the insulative layer; and wherein the alignment means produced in step (d) are produced by placing the substrate in an anisotropic etchant for ODE thereof to produce alignment holes in the substrate bounded by {111} planes, which remain covered by the insulative layer on the opposite first surface of the substrate.

* * * * *